US011880079B2

(12) United States Patent
Bushnell et al.

(10) Patent No.: US 11,880,079 B2
(45) Date of Patent: Jan. 23, 2024

(54) STRUCTURE FOR FLAMING DROPLET SUPPRESSION IN OPTICAL FIBER CABLES

(71) Applicant: Corning Research & Development Corporation, Corning, NY (US)

(72) Inventors: Mark Hanson Bushnell, Hickory, NC (US); Bradley Grant Chapman, Hickory, NC (US); Harold Edward Hudson, II, Conover, NC (US); Toua Lo, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 17/697,371

(22) Filed: Mar. 17, 2022

(65) Prior Publication Data
US 2022/0214511 A1     Jul. 7, 2022

Related U.S. Application Data

(63) Continuation of application No. PCT/US2020/053015, filed on Sep. 28, 2020.

(60) Provisional application No. 62/910,799, filed on Oct. 4, 2019.

(51) Int. Cl.
G02B 6/44 (2006.01)
B29D 11/00 (2006.01)
C03C 25/105 (2018.01)
C03C 25/18 (2006.01)

(52) U.S. Cl.
CPC ...... *G02B 6/4435* (2013.01); *B29D 11/00875* (2013.01); *C03C 25/105* (2013.01); *C03C 25/18* (2013.01); *G02B 6/4432* (2013.01); *G02B 6/4436* (2013.01)

(58) Field of Classification Search
CPC .................................................. G02B 6/4436
See application file for complete search history.

(56) References Cited

U.S. PATENT DOCUMENTS

| 3,823,255 A | * | 7/1974 | La Gase | ........... H01B 7/295 |
| | | | | 174/121 SR |
| 3,979,356 A | * | 9/1976 | Walters | ........... H01B 3/441 |
| | | | | 428/379 |
| 4,447,122 A | | 5/1984 | Sutehall | |

(Continued)

FOREIGN PATENT DOCUMENTS

| CN | 205862824 U | * | 1/2017 |
| WO | 2019/010291 A1 | | 1/2019 |

OTHER PUBLICATIONS

International Search Report and Written Opinion of the International Searching Authority; PCT/US2020/053015; dated Jan. 13, 2021; 12 pages; European Patent Office.

*Primary Examiner* — Charlie Y Peng
(74) *Attorney, Agent, or Firm* — William D. Doyle

(57) ABSTRACT

An optical communication cable includes a jacket having an interior surface that defines a cable jacket internal cross-sectional area and a plurality of optical fibers, wherein less than 60% of the cable jacket internal cross-sectional area is occupied by the cross-sectional area of the plurality of optical fibers. A scaffolding structure is provided adjacent to and supporting the jacket such that when the jacket is subjected to a burn and melts, the melted jacket material bonds to the scaffolding structure rather than sloughing off.

17 Claims, 2 Drawing Sheets

(56) References Cited

U.S. PATENT DOCUMENTS

| | | | | |
|---|---|---|---|---|
| 4,818,060 | A | * | 4/1989 | Arroyo ................ G02B 6/443 |
| | | | | 385/103 |
| 5,001,304 | A | * | 3/1991 | Hardin ................. H01B 7/295 |
| | | | | 174/107 |
| 5,305,411 | A | * | 4/1994 | Arroyo ................ G02B 6/447 |
| | | | | 385/113 |
| 6,049,647 | A | | 4/2000 | Register et al. |
| 6,317,542 | B1 | * | 11/2001 | Hardwick, III ...... G02B 6/4411 |
| | | | | 385/112 |
| 9,728,302 | B1 | * | 8/2017 | McNutt ............... G02B 6/4436 |
| 11,442,236 | B2 | * | 9/2022 | Blazer ................. G02B 6/448 |
| 2004/0184748 | A1 | | 9/2004 | Clatanoff et al. |
| 2015/0110451 | A1 | | 4/2015 | Blazer et al. |
| 2017/0357069 | A1 | | 12/2017 | Messer et al. |

\* cited by examiner

| RUN | CABLE | WALL THICKNESS [mm] | CABLE OD [mm] | NO OF CABLES [n] | FS | CTCB GUARD BAND FS SIGMA [max] | PHRR | CTCB GUARD BAND FS SIGMA [max] | THR | CTCB GUARD BAND FS SIGMA [max] | FIGRA | TSP | PSPR | DROPLETS t≥10s | DROPLETS t≤10s | DAMAGE | RATING WITH "GUARD BAND" |
|---|---|---|---|---|---|---|---|---|---|---|---|---|---|---|---|---|---|
| | | | | | | | | | | | | | | MCT | | SCT | |
| 1.1 | CABLE 10 | 2.5 | 18 | 8 | 1.11 | 1.35 | 27.1 | 34.5 | 14.02 | 18.7 | 48.4 | 0.11 | 44.83 | Y | Y | 87 | Ccas1d2 |
| 1.2 | | | | | 1.11 | 26 | 26 | 33.4 | 13.27 | 18 | 45.8 | 0.1 | 48.43 | N | N | | Ccas1d0 |
| av | W/O STRUCTURE 30 | | | | 1.11 | 1.35 | 26.6 | 34 | 13.65 | 18.3 | 47.1 | 0.11 | 46.63 | | | | Ccas1d2 |
| 2.1 | CABLE 10 | 2.5 | 18 | 8 | 0.9 | 1.14 | 20.9 | 28.3 | 10.99 | 15.7 | 37.8 | 0.08 | 31.75 | N | N | 85 | Ccas1d0 |
| 2.2 | | | | | 1.04 | 1.28 | 27.5 | 34.9 | 14.06 | 18.8 | 42.1 | 0.09 | 42.55 | N | | | Ccas1d0 |
| av | WITH STRUCTURE 30 | | | | 0.97 | 1.21 | 24.2 | 31.6 | 12.52 | 17.22 | 39.95 | 0.09 | 37.15 | | | | Ccas1d0 |
| | CPR CLASS | | | | B2 | C | D | E | F | | | | | | | | |

FIG. 2

STRUCTURE FOR FLAMING DROPLET SUPPRESSION IN OPTICAL FIBER CABLES

CROSS-REFERENCED TO RELATED APPLICATIONS

This application is a continuation of International Application No. PCT/US2020/053015 filed Sep. 28, 2020, which claims the benefit of priority under 35 U.S.C. § 119 of U.S. Provisional Application Ser. No. 62/910,799 filed on Oct. 4, 2019, the content of which is relied upon and incorporated herein by reference in its entirety.

BACKGROUND

Optical fiber cables for use in certain environments, particularly indoor or plenum spaces, are evaluated and rated for resistance to burning and smoke generation, among other factors. New regulations, such as the Construction Products Regulation (CPR) in Europe, include increased scrutiny of burn performance to qualify under the new ratings. For example, the CPR guidelines require that cables are rated on a scale from d0 to d2. One of the factors in determining the burn rating is a flaming droplet test. D0 indicates that when the cable was subjected to a controlled burn, no flaming droplets were produced. D1 indicates the presence of flaming droplets which extinguished within 10 seconds, and d2, which is the lowest rating, covers all other outcomes.

Minimizing flaming droplets has not been a high priority in past cable qualification. However, because of this new rating regime, there is additional focus on achieving good flaming droplet performance.

SUMMARY

In accordance with aspects of the present disclosure, an optical communication cable includes a jacket having an interior surface that defines a cable jacket internal cross-sectional area and a plurality of optical fibers, wherein less than 60% of the cable jacket internal cross-sectional area is occupied by the cross-sectional area of the plurality of optical fibers. A scaffolding structure is provided adjacent to and supporting the jacket such that when the jacket is subjected to a burn and melts, the melted jacket material bonds to the scaffolding structure rather than sloughing off.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 2 is a table illustrating the results of burn testing of cables with and without a scaffolding structure, in accordance with aspects of the present disclosure.

DETAILED DESCRIPTION

Figure 1:
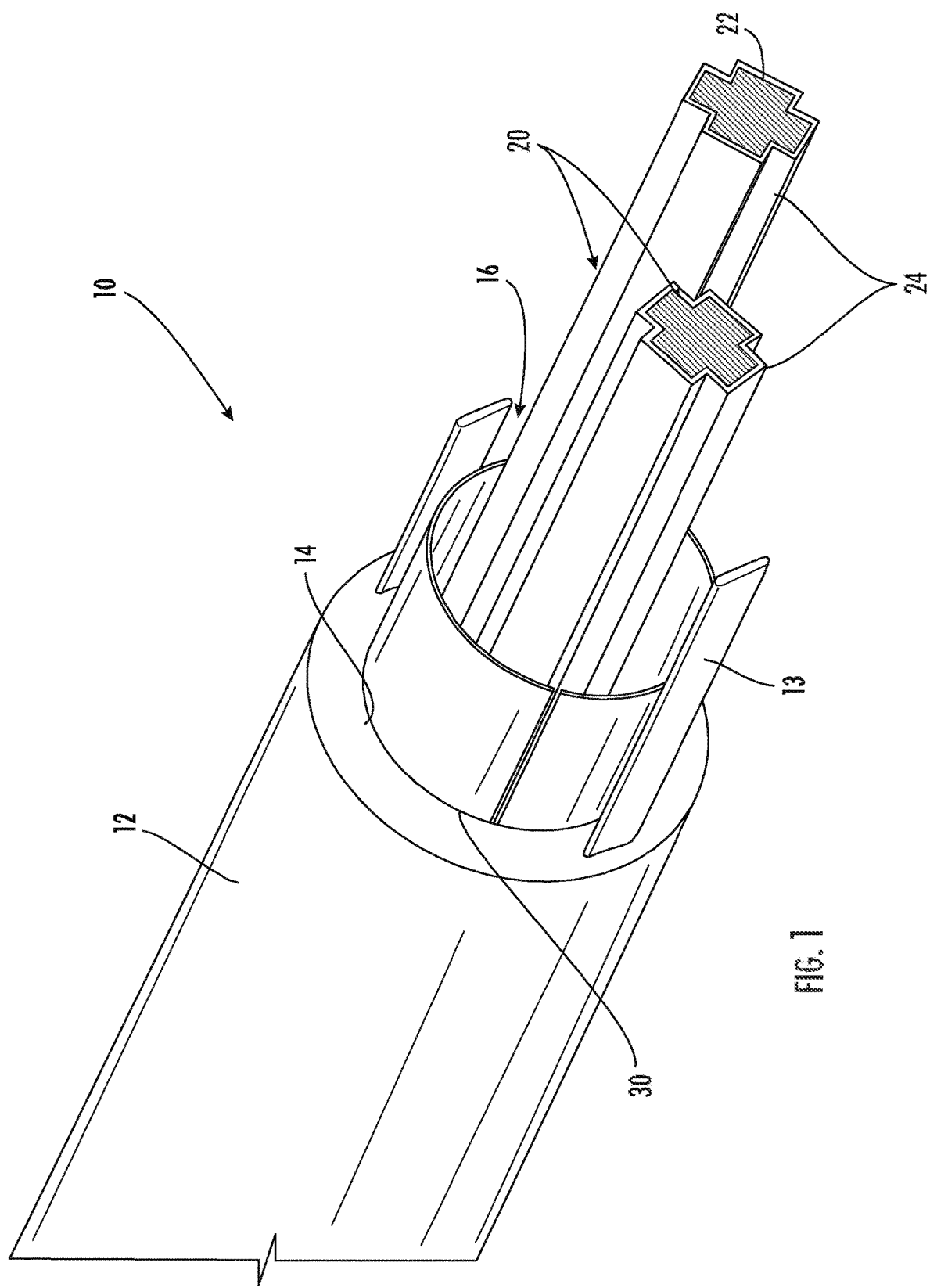
FIG. 1 is a perspective view of an optical fiber cable, in accordance with aspects of the present disclosure.

A conventional optical fiber cable generally includes a jacket that surrounds a number of core elements. The core elements may most commonly include, for example, optical fibers or optical fiber ribbons, strength elements such as a central strength member or strength yarns, buffer tubes or sleeves that segregate groups of fibers into subunits within the core, and/or water blocking technologies such as gels, SAP powders or tapes. When a cable is subjected to a burn test, flaming droplets originate primarily from the jacket layer. Different factors have been observed to contribute to the rate of flame droplet generation, such as the jacket compound material and, with respect in particular to tube-based designs, the amount of free space in the interior of the cable. The more free-space there is in the core of the cable, the more apt a burn test is to produce flaming droplets.

However, the answer to reducing flaming droplets is not simply to change the jacket material or remove the free space from the interior of the cable. Doing so would in many cases substantially impact other mechanical factors, such as flexibility and crush resistance, for example. Accordingly, there is a need for another design attribute that can be used in certain cable designs to reduce flaming droplets when the cable is subjected to burning.

In accordance with aspects of the present disclosure, FIG. 1 illustrates an optical communication cable 10 in which a relatively small portion of the internal cross-sectional area of the cable jacket (or other surrounding cable layer) is occupied by the optical fibers of unstranded optical fiber subunits. Applicant has determined that ranges of internal cross-sectional areas occupied by the optical fibers of the subunits discussed herein provide sufficient free space to allow for the subunits to shift and assume low stress positions during cable bending, and thus, provides good attenuation performance, even though the subunits are unstranded. However, the free space that is good for attenuation performance creates the need to address flaming droplet production during a burn.

As shown in FIG. 1, the optical communication cable 10 includes an outer cable layer or jacket, shown as cable jacket 12, having an inner surface 14 that defines an inner passage or cavity, shown as central bore 16. As will be generally understood, inner surface 14 of jacket 12 defines the central bore 16 within which the various cable components discussed below may be located. In accordance with aspects of the present disclosure, an outside diameter of the cable 10 may be approximately 18 millimeters and the jacket 12 may have a wall thickness of approximately 2.5 millimeters such that an inner diameter of the inner surface 14 is approximately 13 millimeters. Strength members 13, such as fiberglass yarns or GRP rods, for example, may be embedded in the jacket 12 and/or provided in the central bore 16 to provide added tensile strength to the cable 10.

In various embodiments, cable 10 may include a plurality of optical fiber subunits 20. As shown in FIG. 1, each subunit 20 may include a plurality of optical fibers, shown as a stack of optical fiber ribbons 22. Each optical fiber ribbon 22 in the stack has a plurality of optical fibers supported in an aligned array via a polymer ribbon matrix material. Each subunit 20 also includes a subunit jacket 24 that defines a subunit passage, and the plurality of optical fiber ribbons 22 of each subunit are located within the subunit jacket 24. In various embodiments, subunit jacket 24 may be a relatively thin layer of continuous and contiguous polymer material (e.g., contiguous circumferentially and longitudinally for a longitudinal length of at least 10 cm along the length of the cable) that surrounds the optical fiber ribbons 22 closely to contain ribbons 22 with limited compression force such that the plurality of ribbons 22 act as a unitary subunit while ribbon to ribbon friction is sufficiently reduced to allow some longitudinal movement of ribbons during bending to prevent buckling.

In various embodiments, subunit jacket 24 is formed from solid or unfoamed polymer material and may have a thickness of between 0.005 mm and 0.5 mm. In specific embodiments, subunit jacket 24 is formed from solid or unfoamed polymer material that has a thickness between 0.2 mm and 0.35 mm. In other embodiments, subunit jacket 24 may be formed from a foamed material (e.g., a foamed polymer material) and may have a thickness up to 1 mm. In accordance with yet other aspects of the present invention, the subunit jacket 24 may be a multilayered jacket comprising more than one layer of solid polymer material and/or a combination of solid and foamed materials.

In various embodiments, subunit jacket 24 is a thin jacket of extruded material that cools to provide a limited inwardly directed force on to ribbons 22. The inwardly directed force provided by this embodiment of subunit jacket 24 acts to prevent/resist unraveling of the stranded ribbons 22 while allowing sufficient movement of the individual ribbons in the stack during bending. Thus, in this manner (and unlike loose buffer tubes) subunit jacket 24 generally conforms to the shape or outer perimeter of the group or stack of optical fiber ribbons 22 within each subunit. In specific embodiments, subunit jacket 24 is formed from an extrudable polymer material having a thickness as discussed above and a modulus of elasticity of less than 800 MPa at room temperature (e.g., 70 degrees F.). A subunit jacket formed from a material of this thickness and modulus is capable of holding together the subunit, while conforming to the shape of the internal optical fiber ribbons, while also providing a subunit jacket that can be easily opened manually by a user (e.g., peelable) to access the optical fiber ribbons for splicing, connection, etc.

In accordance with aspects of the present invention, a wide variety of optical fiber elements may be contained in each subunit 20 of the cables discussed herein. Moreover, the subunit jackets 24 may be conventional buffer tubes, which have a thicker, more protective wall surrounding the plurality of fibers. In accordance with yet other aspects of the present disclosure, each subunit 20 may include a plurality of loose, individual optical fibers surrounded by the subunit jacket 24. In other embodiments, each subunit 20 may include flexible or rollable optical fiber ribbons, which are different from standard optical ribbons in that the rollable ribbons do not typically have a solid matrix surrounding the entire array of fibers forming the ribbon. Rather, the individual fibers in each rollable ribbon may be bonded at intermittent or spaced intervals such that individual or groups of fiber may be folded or rolled toward other fibers in the array of fibers. In various embodiments, the cables discussed herein may include more than two subunits 20.

Referring to FIG. 1, in specific embodiments, cable 10 may include only two subunits 20, and in a specific embodiment, each subunit 20 includes a stack of optical fiber ribbons 22 such that the subunit includes at least 144 individual fibers. Each optical fiber ribbon 22 includes a plurality of fibers, which may include 4 fibers, 8 fibers, 12 fibers, 16 fibers, 24 fibers, 32 fibers, 36 fibers, etc. Each subunit can include any number of ribbons and any combination of ribbons of different optical fiber counts.

To further facilitate good attenuation performance, cable 10 may be designed to provide sufficient space for subunits 20 and/or the plurality of fibers to reposition and assume low stress positions within cable jacket 12 as cable 10 is bent within various installations. A relatively low portion of the space within cable jacket 12 may be occupied by ribbons 22 and/or subunits 20. In specific embodiments, inner surface 14 of outer cable jacket 12 defines a cable jacket internal cross-sectional area and less than 60% of the cable jacket internal cross-sectional area is occupied by the cross-sectional area of optical fiber ribbons 22. Thus, when cable 10 goes around sheaves, rollers and other bends during installation, or when it is coiled for slack storage, subunits 20 wanting to migrate toward the neutral axis of the bend have the free space available to move in that manner to attain their lowest energy position. This enables good attenuation performance for cable 10.

Referring to the specific embodiment shown in FIG. 1, cable 10 may be configured as a cable suitable for indoor use. In specific embodiments, cable 10 may be a flame-retardant indoor cable or a flame retardant indoor/outdoor cable. In such embodiments, a flame-retardant scaffolding structure 30 is configured into the central bore 16 of the cable 10. The scaffolding structure 30 is placed into the interior of the cable 10 in a manner that the structure 30 is adjacent to and provides support to the jacket 12. In this manner, as the cable 10 is subjected to a burn, as the jacket 12 melts, the jacket material bonds to the scaffolding structure 30 rather than sloughing off the cable to become a flaming droplet. The scaffolding structure 30 may be preferably comprised of a suitable material that has a much higher melting point than the jacket material 12 in order to maintain structural support during a burn. For example, the scaffolding structure 30 may be a substrate material having a fiberglass backing or fiberglass elements embedded throughout, such as fiberglass tapes and/or mica tapes with a fiberglass backing.

FIG. 2 illustrates the results of burn testing of similar cables for new cable designs made with and without the scaffolding structure 30 shown in FIG. 1. Two burns were conducted for each type of cable design, the first design (see the first two rows in the table of FIG. 2 and the third row showing the average of the first two rows) having the same features and dimensions as cable 10 shown in FIG. 1, except without the scaffolding structure 30. The second design subjected to two burns (see the fourth and fifth rows in the table of FIG. 2 and the sixth row showing the average of the fourth and fifth rows) were the cables 10 shown in FIG. 1. The presence of the scaffolding structure 30 did not appear to have a significant impact on the main burn performance characteristics such as flame spread (FS) and heat release (see, e.g., peak heat release rate (PHRR) and total heat release (TEM)). However, although the scaffolding structure 30 does not have a notable impact on aspects such as flame spread and heat performance. there is a significant improvement in flaming droplet performance. Both cable burns with the cables 10 performed significantly well on flaming droplet test such that each would have received the best d0 rating under the CPR regulations, indicating no flaming droplets.

In various embodiments, subunit jacket 24 may be formed from a variety of extruded polymer materials. In various embodiments, subunit jacket 24 is made of a peelable plasticized PVC material tightly extruded to surround each ribbons 22 in each subunit 20. Subunit jacket 24 may be a single extruded layer of plasticized PVC that is both thin (e.g., a thickness of between 0.005 mm and 0.5 mm, specifically, 15 mm and 0.5 mm, and more specifically about 0.25 mm) and comprised of a soft material that easily separates by manually pinching the sheath material. In various embodiments, the elastic modulus of subunit jacket 24 at room temperature is less than 100 MPa and rises to only approximately 800 MPa at cold temperatures (e.g., −10° C.). Various aspects of cable 10, including bundle jackets 24 and the stranding of ribbons 22 within each subunit 20, may be formed via the methods and materials disclosed in PCT Publication WO 2019/010291, published Jan. 10, 2019, which is incorporated herein by reference in its entirety.

In various embodiments, subunits 20 can include a wide variety of optical fibers including multi-mode fibers, single mode fibers, bend insensitive fibers, etc. In various embodiments, cable jacket 12 and subunit jacket 24 may be a variety of materials used in cable manufacturing, such as polyethylene, polyvinyl chloride (PVC), polyvinylidene difluoride (PVDF), nylon, polypropylene, polyester or polycarbonate and their copolymers. In addition, the material of cable jacket 12 and subunit jacket 24 may include small quantities of other materials or fillers that provide different properties to the material of cable jacket 12. For example, the material of cable jacket 12 and/or subunit jacket 24 may include materials that provide for coloring, UV/light blocking (e.g., carbon black), fire resistance as discussed above, etc.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:
    a jacket having an interior surface that defines a cable jacket internal cross-sectional area;
    a plurality of optical fibers, wherein less than 60% of the cable jacket internal cross-sectional area is occupied by the cross-sectional area of the plurality of optical fibers; and
    a scaffolding structure provided adjacent to and supporting the jacket such that when the jacket is subjected to a burn and melts, the melted jacket material bonds to the scaffolding structure rather than sloughing off;
    wherein the plurality of optical fibers defines a plurality of optical fiber ribbons;
    wherein the plurality of optical fiber ribbons is arranged in a plurality of ribbon stacks that define a plurality of subunits;
    wherein each subunit has a subunit jacket that conforms to a shape of the ribbon stack;
    wherein the plurality of subunits is unstranded within the cable jacket; and
    wherein the scaffolding structure is provided around the subunits without an intervening layer.

2. The optical communication cable of claim 1, wherein the subunit jacket is formed from an extrudable polymer material having a modulus of elasticity of less than 800 MPa at room temperature.

3. The optical communication cable of claim 1, further comprising at least two elongate tensile strength elements embedded within the cable jacket and located on opposing sides of the cable jacket.

4. The optical communication cable of claim 3, wherein a longitudinal length of each subunit jacket is substantially the same as a longitudinal length of each of the strength elements.

5. The optical communication cable of claim 1, wherein each optical fiber ribbon comprises at least eight optical fibers supported by a polymer ribbon matrix.

6. The optical communication cable of claim 3, wherein the strength elements are fiberglass yarns or GRP rods.

7. The optical communication cable of claim 1, further comprising strength members occupying area within the cable jacket internal cross-sectional area.

8. The optical communication cable of claim 1, wherein an elastic modulus of the subunit jacket at room temperature is less than 100 MPa and rises to only approximately 800 MPa at approximately −10° C.

9. The optical communication cable of claim 1, wherein the subunit jacket is a single extruded layer of plasticized PVC.

10. The optical communication cable of claim 1, wherein the scaffolding structure is a substrate material having a fiberglass backing or fiberglass elements embedded throughout.

11. The optical communication cable of claim 1, wherein the scaffolding structure comprises fiberglass tape.

12. The optical communication cable of claim 1, wherein the scaffolding structure comprises mica tape.

13. The optical communication cable of claim 1, wherein each subunit jacket comprises a polymer material having a thickness in a range from 0.005 mm to 0.5 mm.

14. The optical communication cable of claim 1, wherein each subunit includes at least 144 optical fibers.

15. The optical communication cable of claim 1, wherein the optical communication cable is configured to achieve a d0 rating according to the Construction Products Regulation.

16. A method of manufacturing an optical communication cable, the method comprising:
- surrounding a plurality of optical fibers with a scaffolding structure; and
- extruding a jacket adjacent to the scaffolding structure such that when the jacket is subjected to a burn and melts, the melted jacket material bonds to the scaffolding structure rather than sloughing off;
- wherein the plurality of optical fibers is a plurality of optical fiber ribbons arranged in a plurality of ribbon stacks that define a plurality of subunits;
- wherein each subunit has a subunit jacket that conforms to a shape of the ribbon stack;
- wherein the plurality of subunits is unstranded within the cable jacket;
- wherein the scaffolding structure is provided around the subunits without an intervening layer; and
- wherein less than 60% of the cable jacket internal cross-sectional area is occupied by the cross-sectional area of the plurality of optical fibers.

17. The method of claim 16, wherein the scaffolding structure is a substrate material having a fiberglass backing or fiberglass elements embedded throughout.

* * * * *